(12) United States Patent
Sato

(10) Patent No.: US 10,670,530 B2
(45) Date of Patent: Jun. 2, 2020

(54) RAMAN PROBE AND RAMAN SPECTRUM MEASURING DEVICE

(71) Applicant: OLYMPUS CORPORATION, Tokyo (JP)

(72) Inventor: Akira Sato, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/429,537

(22) Filed: Jun. 3, 2019

(65) Prior Publication Data

US 2019/0285549 A1    Sep. 19, 2019

Related U.S. Application Data

(63) Continuation of application No. PCT/JP2016/087850, filed on Dec. 19, 2016.

(51) Int. Cl.
*G01N 21/65* (2006.01)

(52) U.S. Cl.
CPC ......... *G01N 21/65* (2013.01); *G01N 2201/08* (2013.01)

(58) Field of Classification Search
CPC ............. G01N 21/65; G01N 2021/653; G01N 2021/655; G01N 2021/656; G01N 21/658; G01J 3/44; G01J 3/4406; G01J 3/4412
See application file for complete search history.

(56) References Cited

U.S. PATENT DOCUMENTS 7,184,142 B2    2/2007  Komachi et al.
7,647,092 B2    1/2010  Motz et al.
2003/0191398 A1  10/2003  Motz et al.
2004/0073120 A1   4/2004  Motz et al.
2004/0152992 A1   8/2004  Zeng
(Continued)

FOREIGN PATENT DOCUMENTS

EP        1 821 097 A1    8/2007
JP     2000-131145 A      5/2000
(Continued)

OTHER PUBLICATIONS

International Search Report dated Mar. 7, 2017 received in PCT/JP2016/087850.

(Continued)

*Primary Examiner* — Violeta A Prieto
(74) *Attorney, Agent, or Firm* — Scully, Scott, Murphy & Presser, P.C.

(57) ABSTRACT

A Raman probe includes: a first illuminating fiber and a second illuminating fiber that are arranged in series and that are formed of different materials from each other; a coupling optical system for optically coupling the first and second illuminating fibers; a light-collecting fiber that is formed of the same material as the second illuminating fiber and that collects Raman scattered light from an examination subject; and an optical filter that is disposed between the first and second illuminating fibers and that selectively transmits a laser beam being guided by the first illuminating fiber and, of Raman scattered light of the first illuminating fiber excited by the laser beam, Raman scattered light the amount of Raman shift of which is smaller than a predetermined amount of Raman shift in a Raman spectrum of the examination subject.

5 Claims, 13 Drawing Sheets

(56) References Cited

U.S. PATENT DOCUMENTS

| | | | |
|---|---|---|---|
| 2006/0139633 A1 | 6/2006 | Puppels et al. | |
| 2012/0127459 A1* | 5/2012 | Handerek | G01D 5/353 356/73.1 |
| 2012/0236303 A1* | 9/2012 | Marple | G01J 3/0218 356/301 |
| 2015/0377701 A1 | 12/2015 | Pawluczyk et al. | |
| 2016/0177366 A1* | 6/2016 | Auner | G01J 3/44 435/5 |
| 2017/0071509 A1* | 3/2017 | Pandey | A61B 5/12 |
| 2017/0202462 A1 | 7/2017 | Motz et al. | |

FOREIGN PATENT DOCUMENTS

| | | |
|---|---|---|
| JP | 2005-522293 A | 7/2005 |
| JP | 2006-508358 A | 3/2006 |
| JP | 2010-249835 A | 11/2010 |
| JP | 2016-505148 A | 2/2016 |
| WO | 03/087793 A1 | 10/2003 |
| WO | 2004/051242 A1 | 6/2004 |
| WO | 2004064627 A1 | 8/2004 |
| WO | 2014/121389 A1 | 8/2014 |

OTHER PUBLICATIONS

Santos, L.F., et al., "Fiber-Optic Probes for in Vivo Raman Spectroscopy in the High-Wavenumber Region", Oct. 15, 2005, pp. 6747-6752, vol. 77, No. 20.

Lieber, C., et al., "Automated Method for Subtraction of Fluorescence from Biological Raman Spectra", 2003, pp. 1363-1367, vol. 57, No. 11.

Santos, L.F., et al., "Fiber-Optic Probes for in Vivo Raman Spectroscopy in the High-Wavenumber Region", Analytical Chemistry, Oct. 15, 2005, pp. 6747-6752, vol. 77, No. 20.

Lieber, C., et al., "Automated Method for Subtraction of Fluorescence from Biological Raman Spectra", Applied Spectroscopy, 2003, pp. 1363-1367, vol. 57, No. 11.

* cited by examiner

RAMAN PROBE AND RAMAN SPECTRUM MEASURING DEVICE

CROSS-REFERENCE TO RELATED APPLICATIONS

This is a continuation of International Application PCT/JP2016/087850 which is hereby incorporated by reference herein in its entirety.

TECHNICAL FIELD

The present invention relates to a Raman probe and a Raman spectrum measuring device.

BACKGROUND ART

In measurement of Raman spectra of examination subjects, such as biological tissue, optical fibers have been used to radiate laser beams and receive Raman scattered light. Because constituent materials, including silica etc., forming such an optical fiber also generate Raman scattered light due to a laser beam being guided by the optical fiber, an observed spectrum acquired by using the optical fiber also contains a Raman spectrum of the optical fiber as noise. Furthermore, the observed spectrum contains, as noise, background light signals originating from light other than Raman scattered light of the examination subject, such as Rayleigh scattered light and autofluorescence. To overcome this problem, methods for reducing noise contained in observed spectra have been proposed (refer to, for example, PTL 1 and 2 and NPL 1).

PTL 1 and 2 each disclose a Raman probe in which an optical filter that cuts Raman scattered light generated by an optical fiber and that transmits only a laser beam is provided at the distal end of a radiating optical fiber and an optical filter that transmits Raman scattered light of biological tissue and that cuts reflection light of the laser beam is provided at the distal end of a light-receiving optical fiber. According to such a configuration, a Raman spectrum of the examination subject can be acquired, the spectrum being free of the Raman spectrum of the optical fiber and exhibiting a high signal-to-noise ratio.

NPL 1 discloses a method in which the spectrum waveform of background light contained in an observed spectrum is fitted with a third- to seventh-order high-order polynomial, and the background light signal contained in the observed spectrum is removed by subtracting the fitted waveform from the observed spectrum.

CITATION LIST

Patent Literature

{PTL 1}
U.S. Pat. No. 7,647,092
{PTL 2}
U.S. Pat. No. 7,184,142

Non Patent Literature

{NPL 1}
Chad A. Lieber et al., "Automated method for subtraction of fluorescence from biological Raman spectra.", Applied Spectroscopy, November 2003, Vol. 57, Issue 11, pp. 1363-1367

SUMMARY OF INVENTION

One aspect of the present invention is a Raman spectrum measuring device including: a Raman probe that guides a laser beam from a laser light source, that emits the laser beam towards an examination subject, and that receives Raman scattered light from the examination subject excited by the laser beam, the Raman probe including: a first illuminating fiber that guides the laser beam that is incident thereon from the laser light source; a second illuminating fiber that is arranged in series with the first illuminating fiber, that guides light emitted from the first illuminating fiber, the light containing the laser beam, and that emits the light towards the examination subject; a coupling optical system that optically couples the first illuminating fiber and the second illuminating fiber; an optical filter that is disposed between the first illuminating fiber and the second illuminating fiber, that transmits, of the light emitted from the first illuminating fiber, light having a wavelength equal to or shorter than a predetermined wavelength, the light containing the laser beam, and that blocks light having a wavelength longer than the predetermined wavelength; and a light-collecting fiber that collects light from the examination subject, the light containing Raman scattered light of the examination subject. The first illuminating fiber and the second illuminating fiber are formed of different materials from each other. The second illuminating fiber and the light-collecting fiber are formed of the same material as each other. The optical filter transmits, of Raman scattered light of the first illuminating fiber excited by the laser beam, Raman scattered light the amount of Raman shift of which is smaller than a predetermined amount of Raman shift in a Raman spectrum of the examination subject. The Raman spectrum measuring device further includes: a laser light source that supplies the laser beam to the first illuminating fiber; a detector that detects light collected by the light-collecting fiber and that acquires data on an observed spectrum containing the Raman spectrum of the examination subject; a memory that stores a reflection spectrum of the Raman probe, the reflection spectrum being acquired by collecting, by means of the light-collecting fiber, reflection light of light emitted from the second illuminating fiber and detecting the reflection light by means of the detector; and a calculator that determines, by referring to an intensity of a Raman band originating from the first illuminating fiber appeared in a Raman shift region different from a Raman band originating from the examination subject, a coefficient to be multiplied by the reflection spectrum so that an intensity of a band of the Raman scattered light of the first illuminating fiber, the Raman scattered light having passed through the optical filter, becomes equal to or smaller than a predetermined threshold value and that subtracts the reflection spectrum multiplied by the coefficient from the observed spectrum.

DESCRIPTION OF EMBODIMENTS

Figure 1:
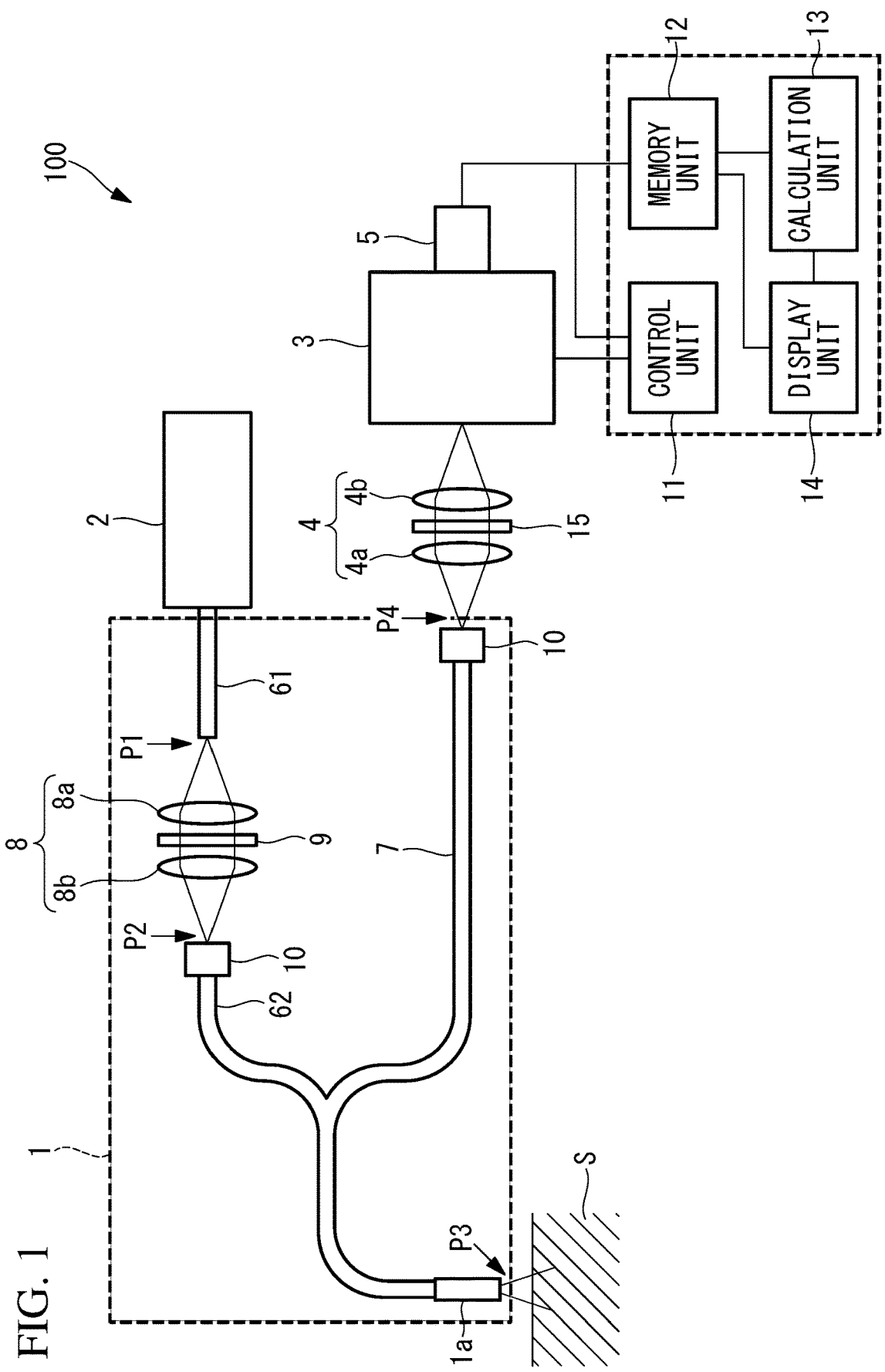
FIG. 1 is an overall configuration diagram of a Raman probe and a Raman spectrum measuring device according to one embodiment of the present invention.

A Raman probe 1 according to one embodiment of the present invention and a Raman spectrum measuring device 100 provided with the Raman probe 1 will now be described with reference to the drawings.

The Raman spectrum measuring device 100 according to this embodiment includes: a laser light source 2; the Raman probe 1 that radiates a laser beam on an examination subject S and that receives light from the examination subject S; a spectrometer (detection unit) 3 for spectrally dispersing the light received by the Raman probe 1; a coupling optical system 4 disposed between the Raman probe 1 and the spectrometer 3; and a photodetector (detection unit) 5 that detects the light spectrally dispersed by the spectrometer 3 and that acquires data on an observed spectrum.

The laser light source 2 is, for example, a semiconductor laser light source for outputting a near-infrared laser beam.

In order from the proximal end side, the Raman probe 1 includes: a first illuminating fiber 61 and a second illuminating fiber 62 that are arranged in series; a light-collecting fiber 7 that is disposed parallel to the illuminating fibers 61 and 62; and a coupling optical system 8 and an optical filter 9 that are disposed between the first illuminating fiber 61 and the second illuminating fiber 62.

The proximal end of the first illuminating fiber 61 is connected to the laser light source 2, and the distal end of the first illuminating fiber 61 is optically coupled to the proximal end of the second illuminating fiber 62 via the coupling optical system 8. The second illuminating fiber 62 and the light-collecting fiber 7 are bundled into one fiber on the distal end side, and the distal end portion of the second illuminating fiber 62 and the distal end portion of the light-collecting fiber 7 are housed in a probe head 1a disposed at the distal end portion of the Raman probe 1. The second illuminating fiber 62 and the light-collecting fiber 7 are split off from each other at an intermediate position in the longitudinal direction, and the proximal end of the light-collecting fiber 7 is optically coupled to the spectrometer 3 via the coupling optical system 4.

A laser beam that comes from the laser light source 2 and that is incident on the first illuminating fiber 61 propagates in the first illuminating fiber 61, the coupling optical system 8, and the second illuminating fiber 62 and is emitted via the probe head 1a towards the examination subject S. In addition, Raman scattered light excited in the examination subject S as a result of being irradiated with the laser beam is collected by the light-collecting fiber 7, is guided by the light-collecting fiber 7 and the coupling optical system 4, and is made incident on the spectrometer 3.

The first illuminating fiber 61 and the second illuminating fiber 62 are formed of different materials from each other, and the second illuminating fiber 62 and the light-collecting fiber 7 are formed of the same material as each other. The material of the first illuminating fiber 61 is selected according to the composition of the examination subject S. More specifically, the material of the first illuminating fiber 61 is selected so that at least a portion of the Raman scattered light, excited by a laser beam, of the first illuminating fiber 61 has a smaller amount of Raman shift than a predetermined amount of Raman shift in the Raman scattered light of the examination subject S excited by a laser beam L.

If the examination subject S is biological tissue, the above-described predetermined amount of Raman shift is set as follows. More specifically, because many Raman bands originating from biogenic substances including protein such as collagen, carbohydrate, lipid, nucleic acid, etc. in biological tissue appear in the range from 800 $cm^{-1}$ to 1800 $cm^{-1}$, a Raman shift value of 800 $cm^{-1}$, which is the lower limit of that range, is set as the predetermined amount of Raman shift. Therefore, a material that generates Raman scattered light having a smaller amount of Raman shift than 800 $cm^{-1}$, which is the lower limit of the range in which the Raman bands corresponding to the above-described substances of biological tissue appear, is selected as the material of the first illuminating fiber 61. Examples of such a material include fluorinated plastic (perfluorinated plastic), acrylic resin (polymethylmethacrylate resin: PMMA), and single-crystal sapphire.

The material of the second illuminating fiber 62 and the light-collecting fiber 7 is preferably a material the Raman spectrum of which does not superimpose on the Raman spectrum of the first illuminating fiber 61. Such a material of the second illuminating fiber 62 and the light-collecting fiber 7 is preferably silica with a small hydroxyl group content.

The coupling optical system 8 is a collimating optical system formed of a combination of: a lens 8a for converting, into a collimated beam, light emitted as a diverging light beam from the distal end of the first illuminating fiber 61;

and a lens 8b for focusing the collimated beam formed by this lens 8a onto the proximal end of the second illuminating fiber 62.

The optical filter 9 is a dielectric multilayer film filter for selectively transmitting light having wavelengths equal to or less than a predetermined wavelength. The optical filter 9 is preferably disposed between the lenses 8a and 8b, where the light emitted from the first illuminating fiber 61 is converted into a collimated beam.

Attaching/detaching sections 10 are provided between the second illuminating fiber 62 and the coupling optical system 8 and between the light-collecting fiber 7 and the coupling optical system 4, respectively. The second illuminating fiber 62 and the light-collecting fiber 7 can be replaced by attaching and detaching the attaching/detaching sections 10. The attaching/detaching sections 10 have FC connectors or SMA connectors and can be attached and detached by means of the FC connectors or SMA connectors provided on the end surfaces of the second illuminating fiber 62 and the light-collecting fiber 7. By doing so, in the Raman probe 1, the first illuminating fiber 61 formed of a special material, such as fluorinated plastic, acrylic resin, or single-crystal sapphire, is configured to be not replaceable, whereas the second illuminating fiber 62 and the light-collecting fiber 7 formed of a relatively inexpensive material are configured to be replaceable.

Here, components of light at each position in the optical path of the Raman probe 1 will be described.

Figure 2:
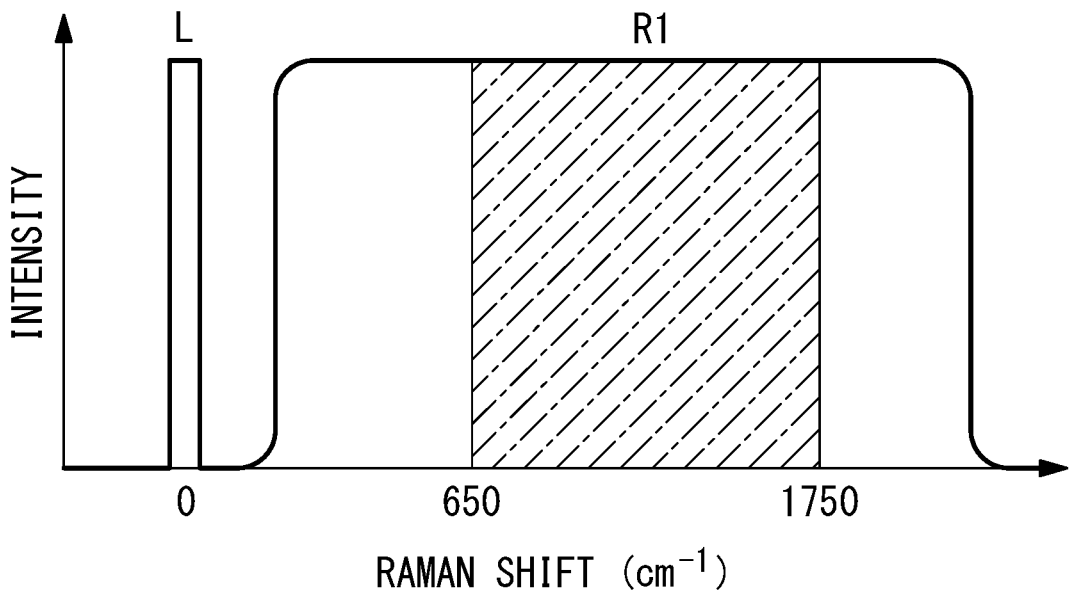
FIG. 2 is a diagram schematically depicting a spectrum of light emitted from a first illuminating fiber.

As shown in FIG. 2, light emitted from the distal end of the first illuminating fiber 61 contains the laser beam L coming from the laser light source 2 and Raman scattered light R1 of the constituent material of the first illuminating fiber 61, the Raman scattered light R1 being excited by the laser beam L being guided by the first illuminating fiber 61. The monochrome laser beam L is narrow-band light, whereas the Raman scattered light R1 is broadband light.

Figure 3:
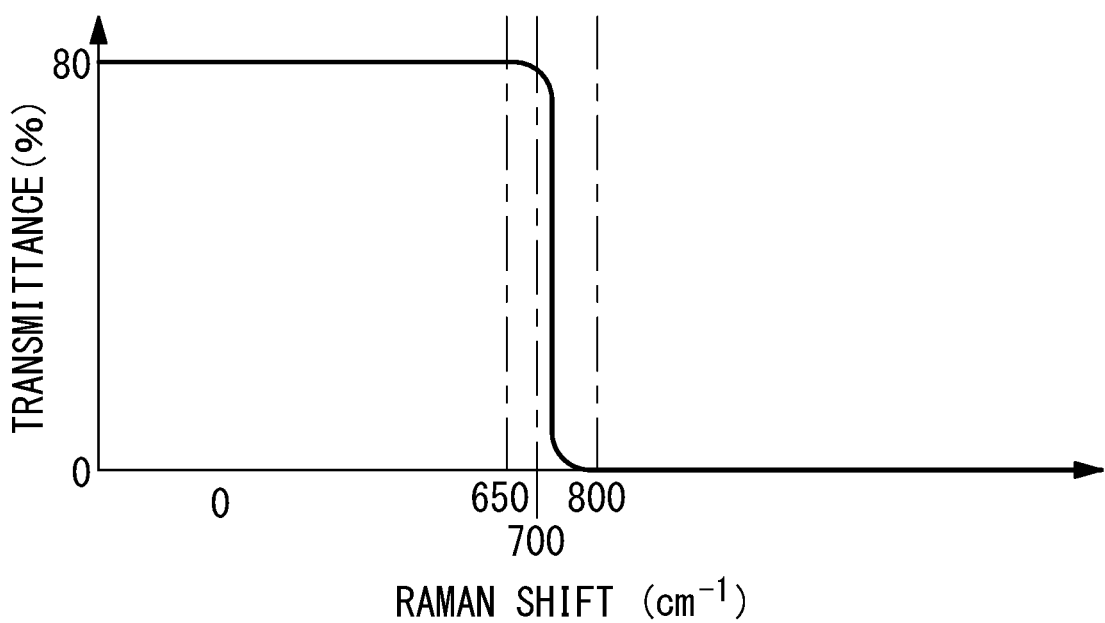
FIG. 3 is a diagram schematically depicting spectral transmission characteristics of an optical filter.
Figure 4:
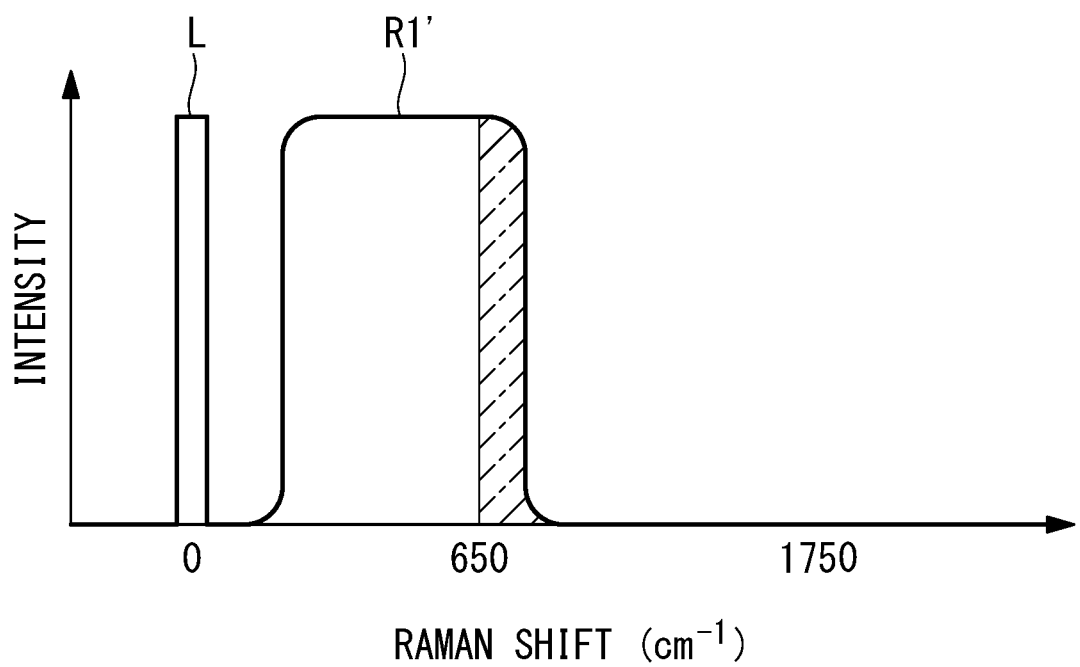
FIG. 4 is a diagram schematically depicting a spectrum of light incident upon a second illuminating fiber.

The optical filter 9 is a short wavelength transmission filter having spectral transmittance characteristics as shown in FIG. 3 and, of the Raman scattered light R1, blocks Raman scattered light having an amount of Raman shift of 800 $cm^{-1}$ or more while transmitting Raman scattered light having an amount of Raman shift of 700 $cm^{-1}$ or less and transmits the laser beam L. In this manner, the optical filter 9 selectively transmits the laser beam L and, of the Raman scattered light R1 appearing on the longer wavelength side relative to the wavelength of the laser beam L, partial Raman scattered light R1' on the shorter wavelength side relative to the amount of Raman shift of 700 $cm^{-1}$ or less. Therefore, as shown in FIG. 4, the partial Raman scattered light R1' is also incident on the second illuminating fiber 62, together with the laser beam L.

Figure 5:
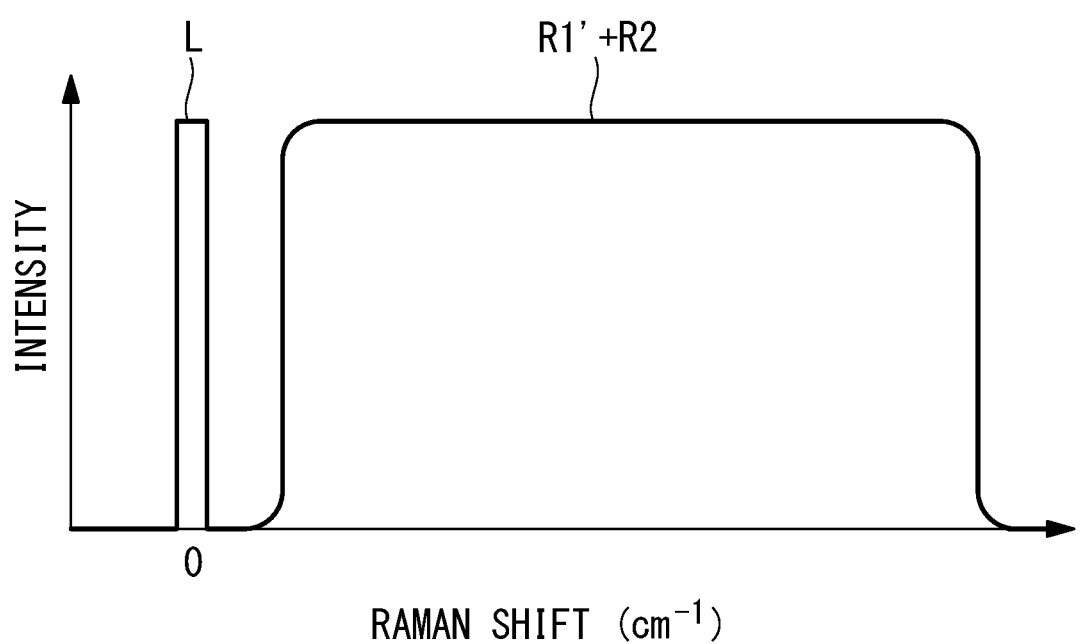
FIG. 5 is a diagram schematically depicting a spectrum of light emitted from the second illuminating fiber.

As shown in FIG. 5, light emitted from the distal end of the second illuminating fiber 62 towards the examination subject S contains Raman scattered light R2 of the constituent material of the second illuminating fiber 62, the Raman scattered light R2 being excited by the laser beam L being guided by the second illuminating fiber 62, in addition to the laser beam L and the light R1' that have been incident on the proximal end of the second illuminating fiber 62.

A portion of the laser beam L radiated from the second illuminating fiber 62 to the examination subject S is reflected or diffusely scattered at a surface of the examination subject S, and another portion thereof propagates in the examination subject S and excites Raman scattered light Robj of constituents of the examination subject S. Furthermore, portions of the Raman scattered light R1' and R2 of the first illuminating fiber 61 and the second illuminating fiber 62, the Raman scattered light R1' and R2 being emitted from the second illuminating fiber 62, are also reflected at the examination subject S. The light-collecting fiber 7 collects these light rays L, Robj, R1', and R2. Light that is emitted from the proximal end of the light-collecting fiber 7 and that is incident on the spectrometer 3 further contains Raman scattered light of the constituent material of the light-collecting fiber 7, the Raman scattered light being excited by the reflection light of the laser beam L being guided by the light-collecting fiber 7.

FIGS. 6, 7, 8, and 9 show the spectra of light at positions P1 (light emission position of the first illuminating fiber 61), P2 (light incident position of the second illuminating fiber 62), P3 (light emission position of the second illuminating fiber 62), and P4 (light emission position of the light-collecting fiber 7), respectively, indicated in FIG. 1. Here, the spectra in FIGS. 6, 7, 8, and 9 are acquired by using, as the first illuminating fiber 61, a perfluorinated plastic optical fiber not containing a CH bond (e.g., FONTEX fiber manufactured by Asahi Glass Co. Ltd.) and by using, as the second illuminating fiber 62 and the light-collecting fiber 7, optical fibers formed of silica having a small hydroxyl group (OH group) content and indicate that the Raman shift values in response to the wavelength of a laser beam with a wavelength of 785 nm emitted from the laser light source 2 fall with the range of 650-1750 $cm^{-1}$ inclusive. This range of Raman shift corresponds to the region indicated by the shaded area in the spectrum of the Raman scattered light R1 of the constituent material of the first illuminating fiber 61, as schematically shown in FIG. 2.

Figure 6:
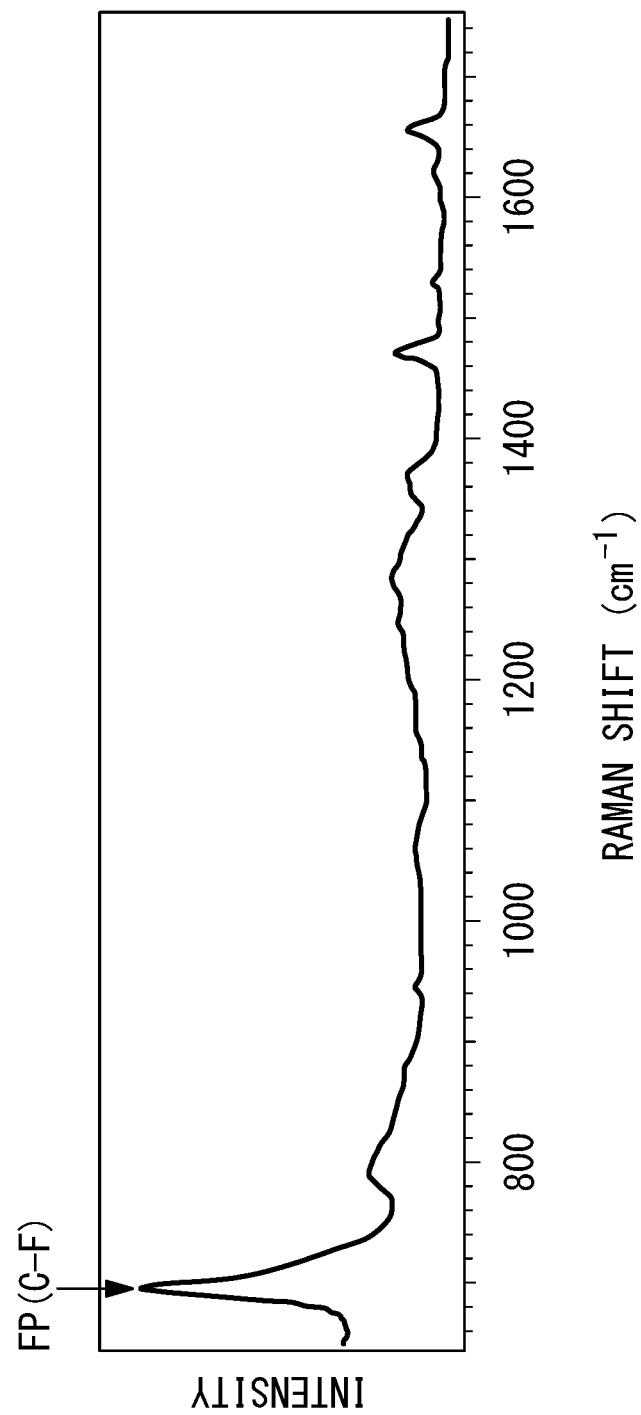
FIG. 6 is a diagram depicting one example of a spectrum of light emitted from the first illuminating fiber in a case where the first illuminating fiber is an optical fiber the constituent material of which is fluorinated plastic.
Figure 7:
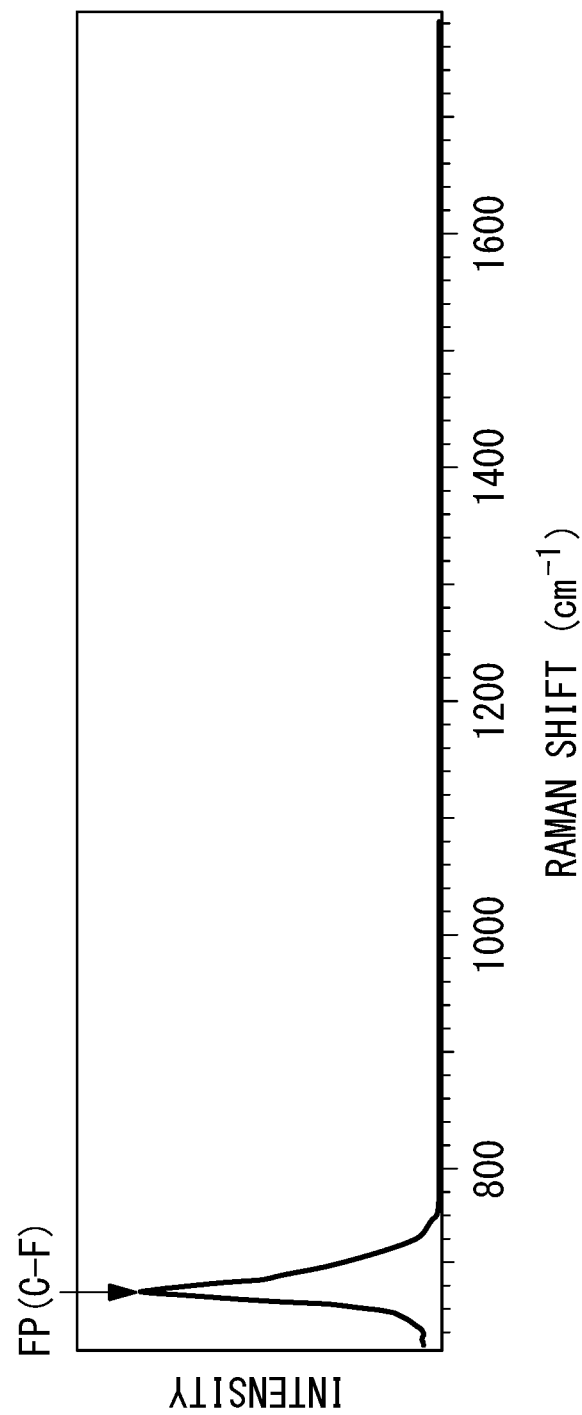
FIG. 7 is a diagram depicting one example of a spectrum of light incident upon the second illuminating fiber in a case where the first illuminating fiber is an optical fiber the constituent material of which is fluorinated plastic.

The spectrum of light emitted from the first illuminating fiber 61 is as shown in FIG. 6, and Raman bands originating from fluorinated plastic appear. In this spectrum, the Raman shift value at the peak of the Raman band, as indicated by FP in FIG. 6, is 692 $cm^{-1}$, and this Raman band FP originates from the carbon-fluorine (C—F) bonds of the fluorinated plastic. As shown in FIG. 3, the optical filter 9 transmits light with a Raman shift value of 700 $cm^{-1}$ or less and blocks light with a Raman shift of 800 $cm^{-1}$ or more. Therefore, as shown in FIG. 7, the spectrum of light incident on the second illuminating fiber 62 contains the Raman band FP originating from fluorinated plastic and does not contain, of the Raman bands originating from fluorinated plastic, Raman bands having a Raman shift of 800 $cm^{-1}$ or more.

Figure 8:
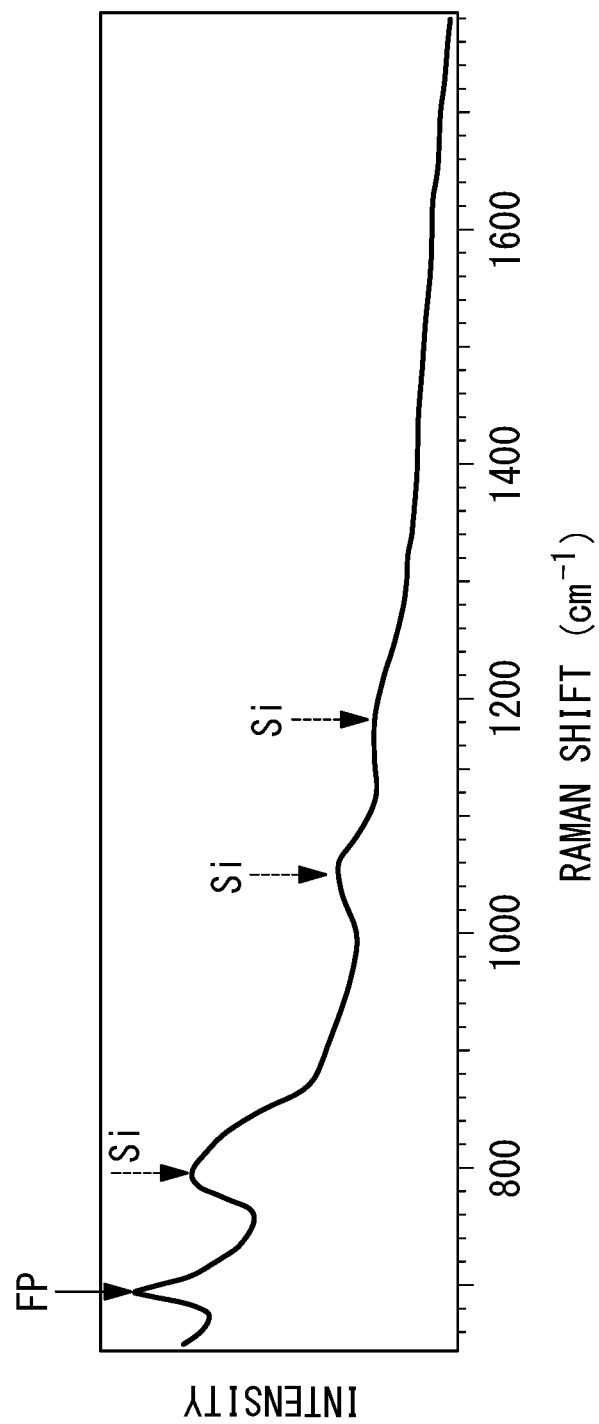
FIG. 8 is a diagram depicting one example of a spectrum of light emitted from the second illuminating fiber in a case where the first illuminating fiber is an optical fiber the constituent material of which is fluorinated plastic.
Figure 9:
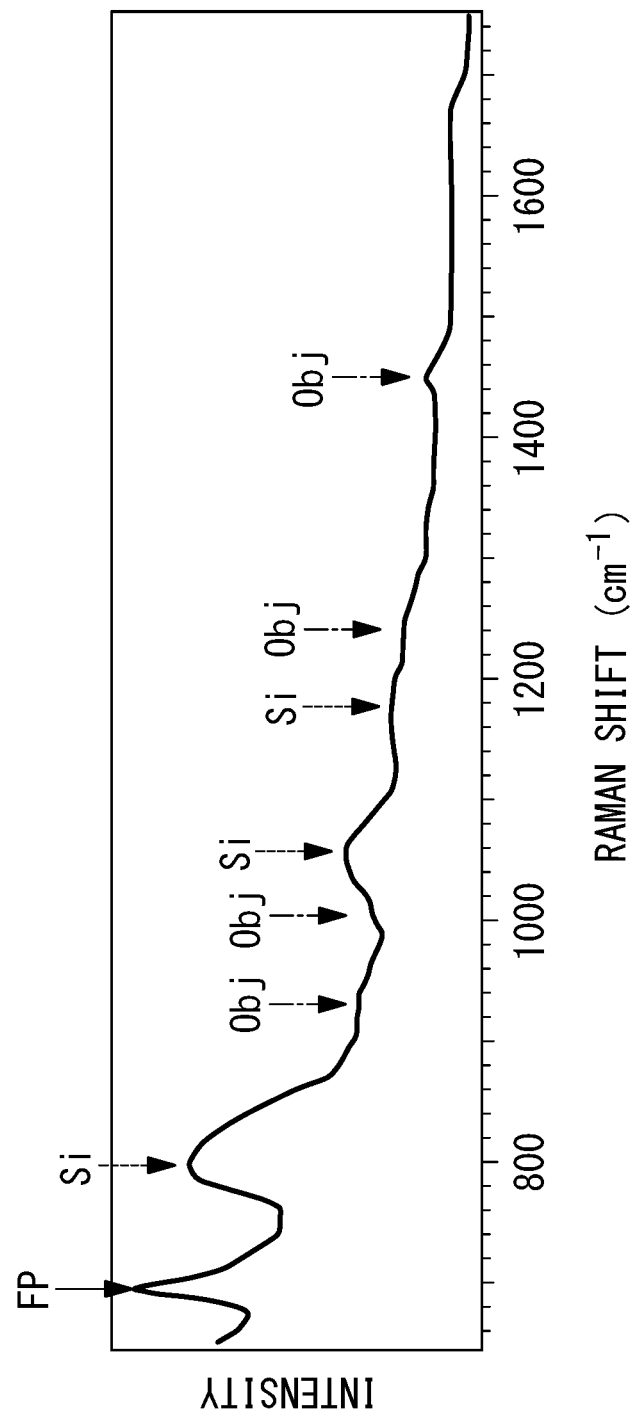
FIG. 9 is a diagram depicting one example of an observed spectrum that is emitted from a light-collecting fiber and that is detected by a photodetector in a case where the first illuminating fiber is an optical fiber the constituent material of which is fluorinated plastic.

As shown in FIG. 8, the spectrum of light emitted from the second illuminating fiber 62 contains the Raman band FP that has passed through the optical filter 9 and that originates from the C—F bonds of fluorinated plastic, as well as Raman bands Si originating from silica serving as the constituent material of the second illuminating fiber 62. FIG. 9 shows a spectrum of light emitted from the proximal end of the light-collecting fiber 7 in a case where the examination subject is biological tissue (connective tissue), and in this spectrum, Raman bands Obj originating from biological molecules, such as collagen serving as a constituent of the examination subject S, are further added to the Raman spectra of the fiber-constituting materials. In this manner, in the spectrum of light incident on the spectrometer 3, the Raman spectra of the fluorinated plastic, silica, and examination subject are superimposed. In addition, because background light signals originating from background light, including Rayleigh scattered light of the laser beam L and autofluorescence of the examination subject S, are also added to the Raman spectra, the spectrum of light incident on the spectrometer 3 has a baseline the intensity of which gently rises towards the shorter wavelength side where the Raman shift is smaller, as shown in the spectrum of FIG. 9.

The coupling optical system 4 is a collimating optical system composed of a pair of lenses 4a and 4b, in the same manner as, for example, the coupling optical system 8, and collects light emitted from the proximal end of the light-collecting fiber 7 to form an image at the position of an entrance slit of the spectrometer 3. An optical filter 15 that blocks reflection light of the laser beam L and that transmits light other than the reflection light is disposed between the lenses 4a and 4b.

The spectrometer 3 spatially disperses, by wavelength, light that has been incident thereon from the light-collecting fiber 7 via the coupling optical system 4 and re-forms an image of the obtained spectrum on the light-receiving surface of the photodetector 5.

The photodetector 5 is a camera provided with an image capturing element in which photoelectric conversion elements, such as CCD elements, are arrayed two-dimensionally and is attached to the spectrometer 3. The photodetector 5 converts, into an electrical signal by means of the photoelectric conversion elements, light that has come from the spectrometer 3 and that has been incident on the light-receiving surface thereof to acquire data on the observed spectrum. The observed spectrum acquired at this time contains the Raman spectra of the examination subject S and the first illuminating fiber 61, the Raman spectrum of the second illuminating fiber 62, the Raman spectrum of the light-collecting fiber 7, and the spectrum of background light such as Rayleigh scattered light and autofluorescence, as described above, in the form of the Raman spectra being superimposed on one another.

As shown in FIG. 1, the Raman spectrum measuring device 100 further includes a control unit 11, a memory unit 12, a calculation unit 13, and a display unit 14.

The control unit 11 controls irradiation intensity and irradiation timing of a laser beam radiated onto the examination subject S by controlling the output intensity and the output timing of the laser beam from the laser light source 2. In addition, the control unit 11 controls the center wavelength of the spectrometer 3, as well as conditions for detecting light (e.g., exposure time and gain) by means of the photodetector 5.

The memory unit 12 stores data on a reflection spectrum of the Raman probe 1. The data on the reflection spectrum is acquired by irradiating an object, such as a low-intensity Raman scattering body that generates only sufficiently weak Raman scattering compared with Raman scattering of a metal plate and biological tissue, with light emitted from the probe head 1a, collecting reflection light from the object by means of the light-collecting fiber 7, spectrally dispersing the collected light by means of the spectrometer 3, and detecting the spectrally dispersed light by the photodetector 5. This data contains data on only Raman spectra of the first illuminating fiber 61, the second illuminating fiber 62, and the light-collecting fiber 7. The data on the reflection spectrum may be pre-stored in the memory unit 12 or may be obtained and stored in the memory unit 12 before the observed spectrum is acquired.

Figure 10:
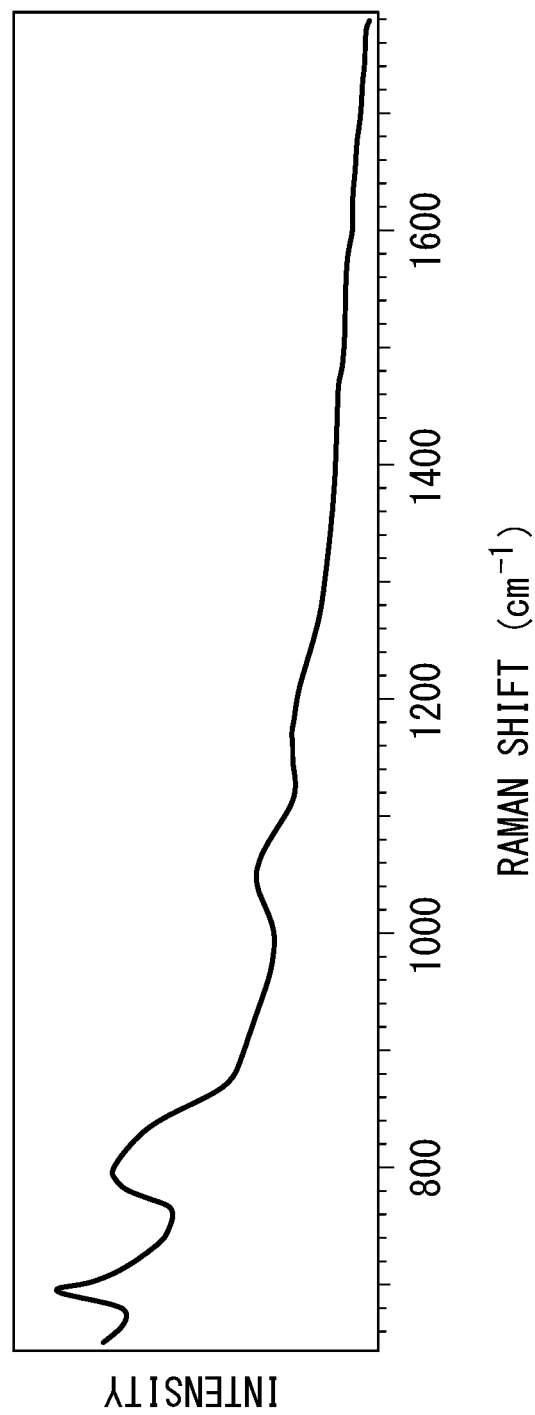
FIG. 10 is a diagram depicting one example of a reflection spectrum of Raman scattered light of the Raman probe in a case where the first illuminating fiber is an optical fiber the constituent material of which is fluorinated plastic.

FIG. 10 shows a reflection spectrum Ref(λ) of the Raman probe 1. In the same manner as in the spectra in FIGS. 6 to 9, the reflection spectrum Ref(λ) in FIG. 10 is acquired by using a fluorinated plastic optical fiber as the first illuminating fiber 61 and by using silica optical fibers as the second illuminating fiber 62 and the light-collecting fiber 7, and the Raman shift values in response to the wavelength of a laser beam fall within a range from 650-1750 cm$^{-1}$ inclusive. In addition, the memory unit 12 stores data on the observed spectrum acquired by the photodetector 5.

The calculation unit 13 calculates a Raman spectrum of the examination subject S by using the data on the observed spectrum and the data on the reflection spectrum of the Raman probe 1 stored in the memory unit 12.

More specifically, the calculation unit 13 calculates a difference spectrum Sub(λ) by subtracting the reflection spectrum Ref(λ) from an observed spectrum Obj(λ) on the basis of expression (1) below. In expression (1), A denotes a coefficient.

$$\text{Sub}(\lambda) = \text{Obj}(\lambda) - A \times \text{Ref}(\lambda) \qquad (1)$$

Figure 11:
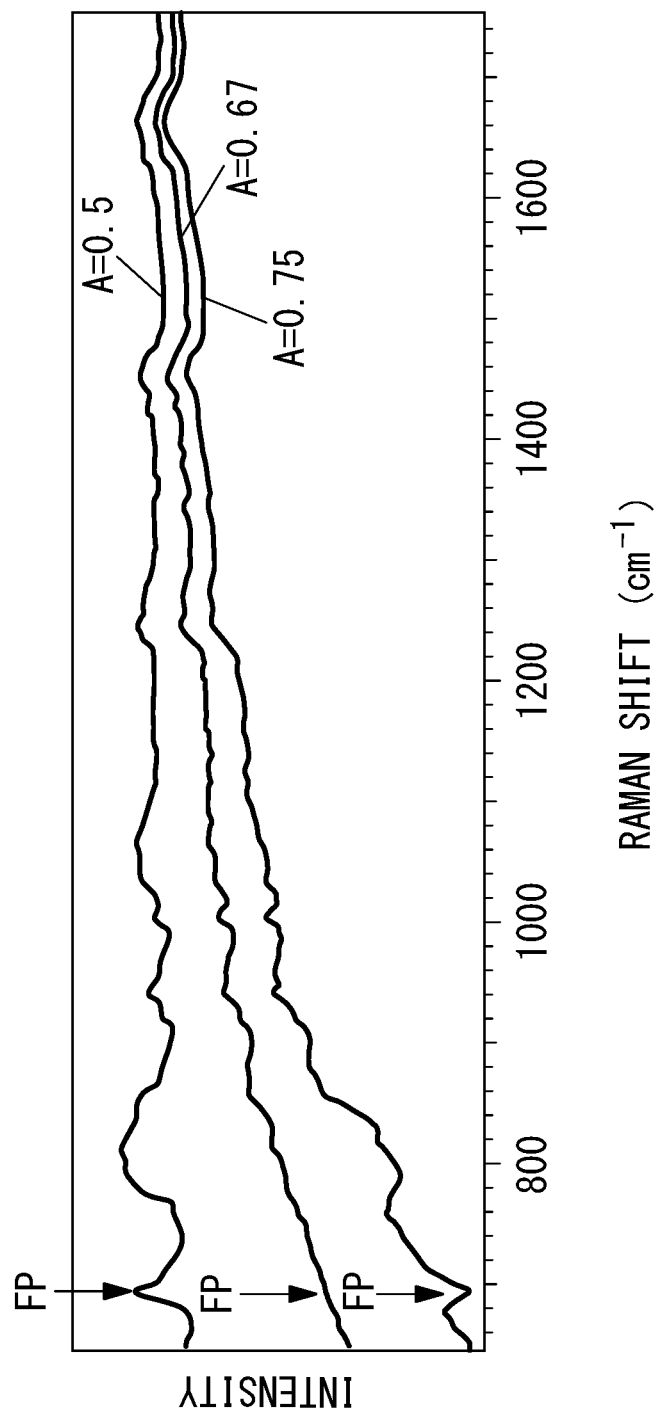
FIG. 11 is a diagram depicting one example of a difference spectrum obtained by subtracting the reflection spectrum from the observed spectrum in a case where the first illuminating fiber is an optical fiber the constituent material of which is fluorinated plastic.
Figure 12:
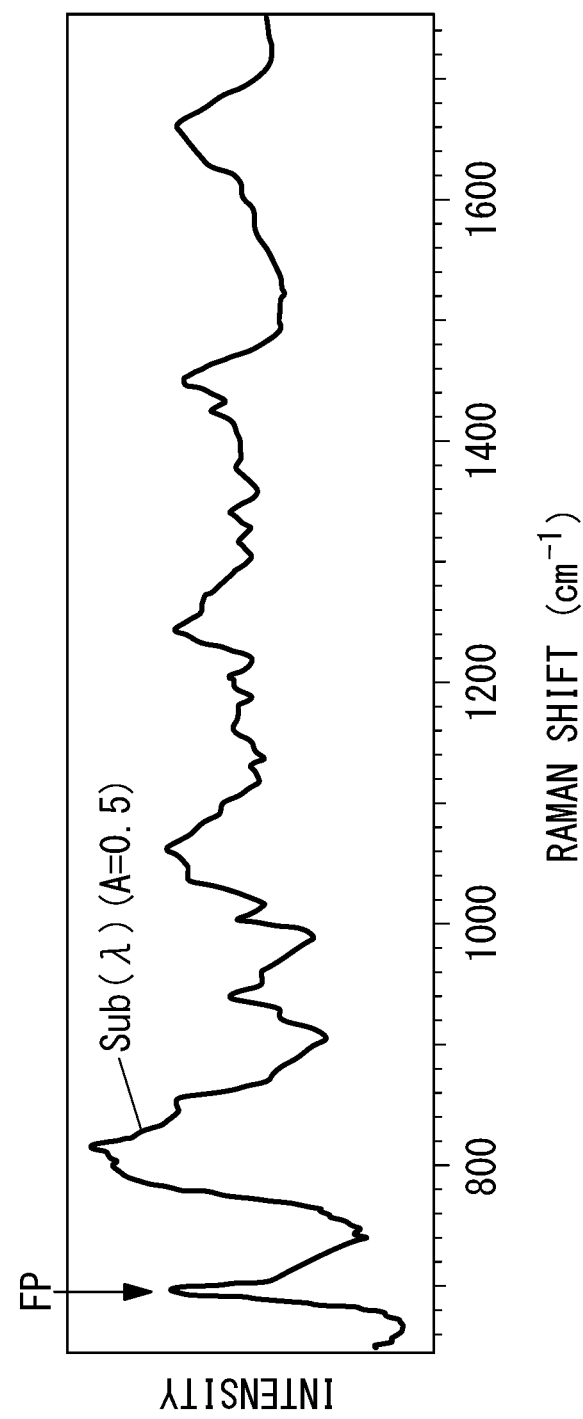
FIG. 12 is a magnified diagram of the difference spectrum with a coefficient A=0.5 shown in FIG. 11 in a case where the first illuminating fiber is an optical fiber the constituent material of which is fluorinated plastic.

FIG. 11 shows the difference spectrum Sub(λ) calculated by using the observed spectrum Obj(λ) in FIG. 9 and the reflection spectrum Ref(λ) in FIG. 10. As shown in FIG. 11, the intensity of the Raman band FP originating from fluorinated plastic (C—F bonds) changes according to the values 0.5, 0.67, and 0.75 of the coefficient A. FIG. 12 shows the difference spectrum Sub(λ) in the case of A=0.5, and FIG. 13 shows the difference spectrum Sub(λ) in the case of A=0.67.

Next, the calculation unit 13 calculates the intensity of a Raman band originating from the first illuminating fiber 61 (e.g., the Raman band FP originating from the C—F bonds having a Raman shift of 692 cm$^{-1}$) in the difference spectrum Sub(λ) and compares the calculated intensity with a predetermined threshold value. The intensity of the Raman band calculated here may be either the maximum peak value or the band integrated intensity.

If the intensity of the Raman band FP is larger than the predetermined threshold value, the calculation unit 13 changes the value of the coefficient A and re-calculates the difference spectrum Sub(λ). The calculation unit 13 repeats changing of the value of the coefficient A and re-calculation of the difference spectrum Sub(λ) until the intensity of the Raman band FP becomes equal to or less than the predetermined threshold value. In the case where the intensity of the Raman band FP is a peak value, the predetermined threshold value is set to a value equivalent to the intensity of the observed spectrum Obj(λ) in the vicinity of the periphery of the Raman band FP. In the case where the intensity of the Raman band FP is an integrated intensity, FPint(Sub(λ)) that causes FPint(Sub(λ))/FPint(Obj(λ)) to become sufficiently smaller than 1 is set as the predetermined threshold value, where FPint(Obj(λ)) is the intensity of the Raman band FP in the observed spectrum Obj(λ) and FPint(Sub(λ)) is the intensity of the Raman band FP in the difference spectrum Sub(λ). As a result of the above-described calculation being repeated in this manner, a difference spectrum Sub(λ) in which the intensity of the Raman band FP originating from the first illuminating fiber 61 becomes a level equivalent to the intensity of background light is obtained eventually. In other words, the difference spectrum Sub(λ) from which the Raman spectrum of the first illuminating fiber 61 has been removed is obtained. At this time, the Raman spectra of the second illuminating fiber 62 and the light-collecting fiber 7 are also removed together.

Figure 13:
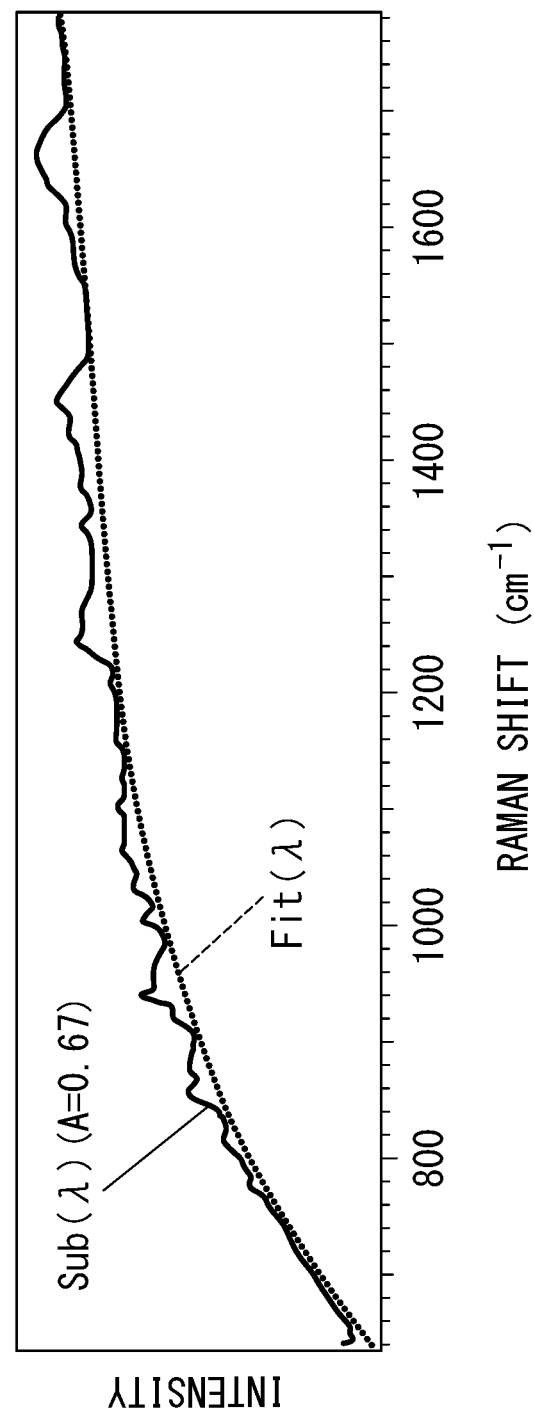
FIG. 13 is a diagram depicting a polynomial fitted waveform (dotted lines) for a difference spectrum (solid line).

When the intensity of the Raman band FP is equal to or smaller than the predetermined threshold value, the calculation unit 13 calculates a polynomial fitted waveform Fit(λ) by fitting the baseline of the difference spectrum Sub(λ) with a polynomial by the least squares method, as shown by the dotted-line waveform in FIG. 13. For calculation of Fit(λ), the method described in, for example, NPL 1 ("Automated method for subtraction of fluorescence from biological Raman spectra.", Applied Spectroscopy, Vol. 57, Issue 11, pp. 1363-1367) is used. The polynomial obtained by applying polynomial fitting to the difference spectrum Sub(λ) by the least squares method is represented as f(λ), and then Sub(λ) or f(λ), whichever has a smaller intensity, is selected by comparing the intensity between Sub(λ) and f(λ) for each wavelength channel, thereby producing a new waveform Subnew(λ). The task of applying polynomial fitting to this Subnew(λ) by the least squares method may be repeated. The polynomial fitted waveform Fit(λ) calculated in this manner approximately represents the background light signal in the difference spectrum Sub(λ).

Figure 14:
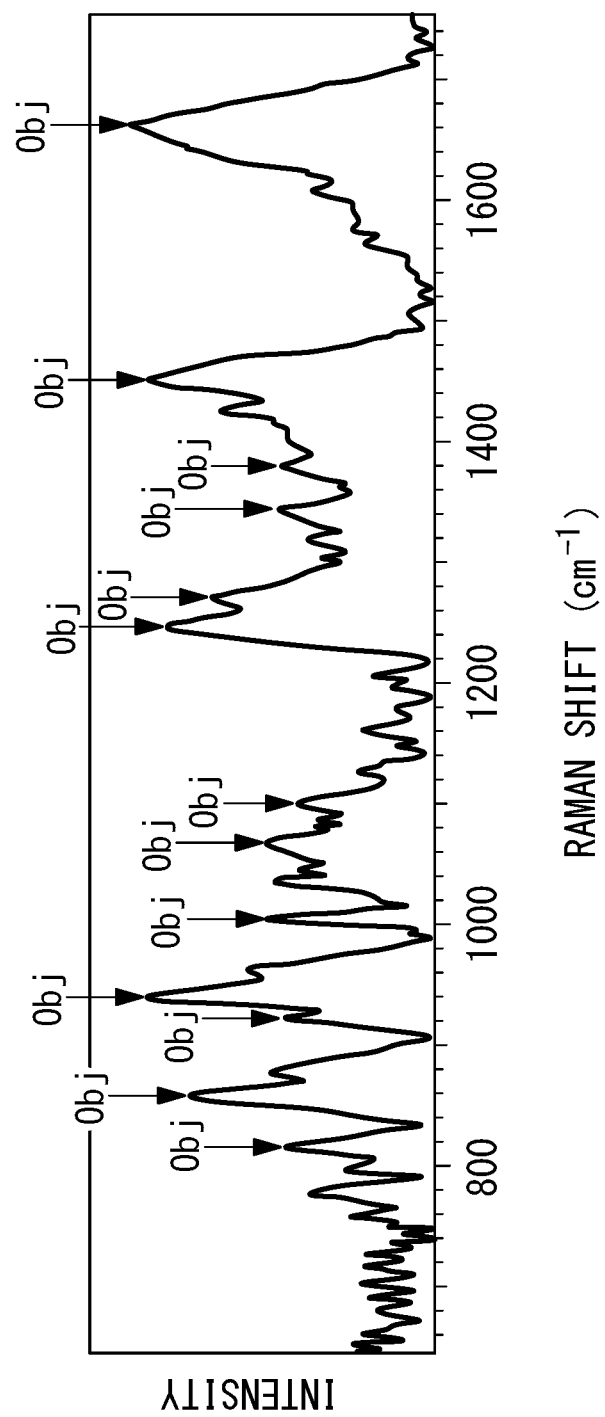
FIG. 14 is a diagram depicting a Raman spectrum of an examination subject obtained by subtracting the polynomial fitted waveform from the difference spectrum in a case where the examination subject is biological tissue (connective tissue).

Next, by subtracting the polynomial fitted waveform Fit(λ) from the difference spectrum Sub(λ), the calculation unit 13 can obtain the Raman spectrum shown in FIG. 14, which is a Raman spectrum of the examination subject S in which the Raman spectra of the first illuminating fiber 61, the second illuminating fiber 62, and the light-collecting fiber 7, as well as the background light signals due to Rayleigh scattered light and autofluorescence, have been removed from the observed spectrum Obj(λ) shown in FIG. 9.

The Raman bands Obj indicated in the Raman spectrum shown in FIG. 14 represent major Raman bands of biological tissue (connective tissue) serving as the examination subject S. For example, the Raman band having a peak in the proximity of 815 $cm^{-1}$ is a Raman band of a collagen polypeptide backbone, the Raman band having a peak in the proximity of 850 $cm^{-1}$ is a Raman band of collagen proline, the Raman band having a peak in the proximity of 920 $cm^{-1}$ is a Raman band of collagen proline, the Raman band having a peak in the proximity of 1005 $cm^{-1}$ is a Raman band of protein phenylalanine, the Raman band having peaks in the proximity of 1240 $cm^{-1}$ and 1260 $cm^{-1}$ is a Raman band of collagen polypeptide backbones, the Raman band having a peak in the proximity of 1450 $cm^{-1}$ is a Raman band of a protein methyl group and methylene group, and the Raman band having a peak in the proximity of 1650 $cm^{-1}$ is a Raman band of a collagen polypeptide backbone. In this manner, in the Raman spectrum in FIG. 14, most signals originating from components other than the examination subject S are removed. The obtained Raman spectrum of the examination subject S is displayed on the display unit 14.

Next, the operation of the Raman probe 1 with the above-described structure and the Raman spectrum measuring device 100 provided with the Raman probe 1 will be described.

When a laser beam is output from the laser light source 2, the laser beam being guided by the first illuminating fiber 61 and the second illuminating fiber 62 is radiated on the examination subject S and excites Raman scattered light in the examination subject S. The Raman scattered light of the examination subject S is collected by the light-collecting fiber 7, is spectrally dispersed in the spectrometer 3, and is detected by the photodetector 5.

At this time, as a result of the laser beam being guided by the first illuminating fiber 61, the Raman scattered light of the first illuminating fiber 61 is added to the laser beam. Then, of the Raman scattered light of the first illuminating fiber 61, Raman scattered light having a Raman shift value of 800 $cm^{-1}$ or more is removed by the optical filter 9, and partial Raman scattered light of the first illuminating fiber 61 is incident on the second illuminating fiber 62.

Subsequently, as a result of the laser beam being guided by the second illuminating fiber 62, Raman scattered light of the second illuminating fiber 62 is further added to the laser beam. Therefore, the examination subject S is irradiated with Raman scattered light of the illuminating fibers 61 and 62, together with the laser beam, and not only the Raman scattered light of the examination subject S but also the Raman scattered light of the illuminating fibers 61 and 62 are collected by the light-collecting fiber 7. Then, as a result of the reflection light of the laser beam being guided by the light-collecting fiber 7, the Raman scattered light of the light-collecting fiber 7 is further added to the light that comes from the light-collecting fiber 7 and that is incident on the spectrometer 3.

Therefore, an observed spectrum in which the Raman spectra of the fibers 61, 62, and 7 are superimposed on the Raman spectrum of the examination subject S is acquired in the photodetector 5. The acquired observed spectrum is stored in the memory unit 12 and is then subjected to arithmetic operations in the calculation unit 13.

Figure 15:
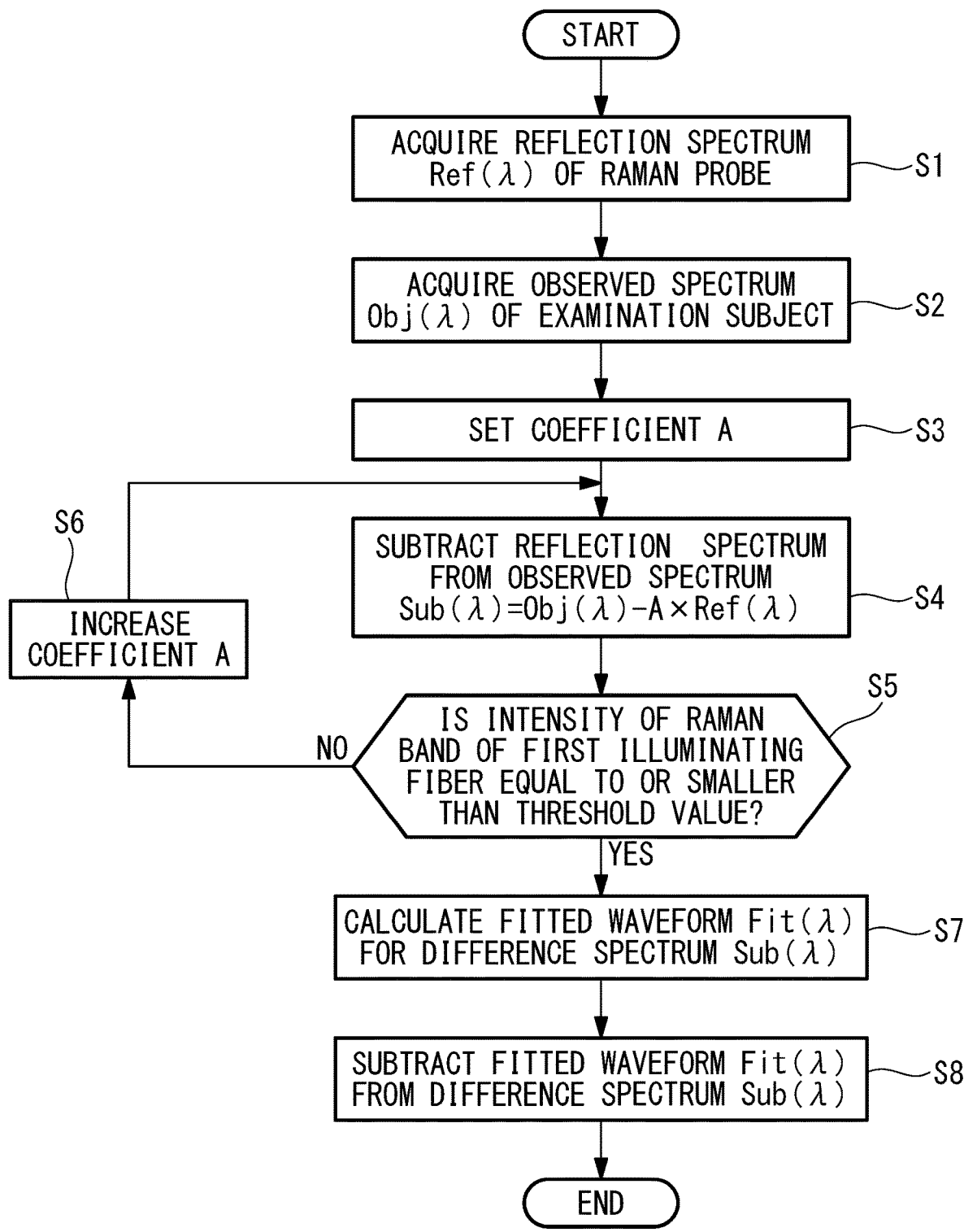
FIG. 15 is a flowchart for illustrating a method for analyzing an observed spectrum with the Raman spectrum measuring device in FIG. 1.

In the calculation unit 13, the reflection spectrum Ref(λ) and the observed spectrum Obj(λ) are read out from the memory unit 12 as shown in FIG. 15 (step S1, S2), and the coefficient A is set (step S3). Next, the difference spectrum Sub(λ) is calculated by subtracting the reflection spectrum Ref(λ) multiplied by the coefficient A from the observed spectrum Obj(λ) (step S4). Then, changing of the coefficient A (step S6) and calculation of the difference spectrum Sub(λ) (step S4) are repeated until the intensity of a Raman band that originates from the first illuminating fiber 61 and that is contained in the difference spectrum Sub(λ) becomes equal to or less than a threshold value (NO in step S5). In steps S3 to S6, a difference spectrum Sub(λ) in which the Raman spectra of the first illuminating fiber 61, the second illuminating fiber 62, and the light-collecting fiber 7 have been removed from the observed spectrum Obj(λ) is obtained.

Next, a polynomial fitted waveform Fit(λ) for the difference spectrum Sub(λ) is calculated (step S7), and the polynomial fitted waveform Fit(λ) is subtracted from the difference spectrum Sub(λ) (step S8). In steps S7 and S8, background light signals are removed from the difference spectrum Sub(λ), and a Raman spectrum of the examination subject S is obtained.

As described above, according to this embodiment, the Raman spectra of the optical fibers 61, 62, and 7 are removed from the observed spectrum not only with high accuracy but also through a small amount of calculation by referring to the intensity of a Raman band originating from the first illuminating fiber 61, the Raman band appearing in a Raman shift region different from the Raman bands originating from the examination subject S, when the reflection spectrum is subtracted from the observed spectrum. Furthermore, the background light signals are removed by subtracting the polynomial fitted waveform Fit(λ) from the obtained difference spectrum Sub(λ). By doing so, there is an advantage in that, even in a case where a commonly used computer is used as the calculation unit 13, a Raman spectrum of the examination subject S having a high signal-to-noise ratio can be obtained at a high speed.

In addition, because the optical filter 9 is disposed between the first illuminating fiber 61 and the second illuminating fiber 62, it is not necessary to make the optical filter 9 compact, unlike a case where an optical filter is provided at the distal end of the second illuminating fiber 62, thus preventing the structure from becoming complicated.

The reason why Raman spectra originating from the constituent materials of all the optical fibers 61, 62, and 7 can be simultaneously removed from the observed spectrum, as described above, on the basis of the intensity of a Raman band of the first illuminating fiber 61 will be described below.

The intensity of Raman scattered light generated in the first illuminating fiber 61 is represented by $L_1\sigma_1 I$, where I is the intensity of a laser beam output from the laser light source 2, $L_1$ is the length of the first illuminating fiber 61, and $\sigma_1$ is the Raman scattering cross section per unit length of the material of the first illuminating fiber 61. In addition, the intensity of Raman scattered light generated in the second illuminating fiber 62 is represented by $\beta L_2 \sigma_2 I$, where $L_2$ is the length of the second illuminating fiber 62, $\sigma_2$ is the Raman scattering cross section per unit length of the material of the second illuminating fiber 62, and $\beta$ is the coupling efficiency between the first illuminating fiber 61 and the second illuminating fiber 62. Therefore, the power of light that is radiated on the examination subject S from the probe head 1a is represented by $I + L_1 \sigma_1 I + \beta L_2 \sigma_2 I$.

In addition, the signal intensity (observed spectrum) of light detected in the photodetector 5 is represented by expression (2) below.

$$\alpha\gamma(L_1\sigma_1 I + \beta L_2\sigma_2 I) + \alpha\gamma L_3\sigma_2 I + S_{in} = \alpha\gamma L_1\sigma_1 + \alpha\beta\gamma L_2\sigma_2 I + \alpha\gamma L_3\sigma_2 I + S_{in} \quad (2)$$

Here, $\alpha$ is the reflectance of light on the surface of the examination subject S, $L_3$ is the length of the light-collecting fiber 7, $\gamma$ is the recovery efficiency of light by means of the light-collecting fiber 7, and $S_{in}$ is the intensity of Raman scattered light from the examination subject S.

On the other hand, the signal intensity (reflection spectrum) of reflection light that has been acquired as a result of the light emitted from the probe head 1a being reflected at a reflector plate having a reflectance $\alpha'$ and then being spectrally dispersed and detected is represented by expression (2') below.

$$\alpha'\gamma L_1\sigma_1 I + \alpha'\beta\gamma L_2\sigma_2 I + \alpha'\gamma L_3\sigma_2 I \quad (2')$$

Expression (3) below is obtained by subtracting the reflection spectrum from the observed spectrum according to expression (1).

$$\alpha\gamma L_1\sigma_1 I + \alpha\beta L_2\sigma_2 I + \alpha\gamma L_3\sigma_2 I + S_{in} - A\times(\alpha'\gamma L_1\sigma_1 I + \alpha'\beta\gamma L_2\sigma_2 I + \alpha'\gamma L_3\sigma_2 I) = (\alpha - A\alpha')\gamma L_1\sigma_1 I + (\alpha - A\alpha')\beta\gamma L_2\sigma_2 I + (\alpha - A\alpha')\gamma L_3\sigma_2 I + S_{in} \quad (3)$$

Here, in a case where the examination subject S is biological tissue composed of stromata, such as connective tissue and elastic tissue, and cells, many Raman bands of biological tissue appear on the longer wavelength side relative to 700 cm$^{-1}$, and thus Raman bands appearing on the shorter wavelength side relative to 700 cm$^{-1}$ are few in number and weak in intensity. Here, in a case where the first illuminating fiber 61 is a fluorinated plastic fiber, the Raman band FP of the C—F bonds of the fluorinated plastic is located at a Raman shift of 692 cm$^{-1}$ and does not superimpose the Raman bands of the biological tissue. Alternatively, in a case where the first illuminating fiber is formed of polymethylmethacrylate (PMMA), the Raman band of the C—COO bond of polymethylmethacrylate is located at a Raman shift of 602 cm$^{-1}$ and does not superimpose the Raman bands of the biological tissue. Alternatively, in a case where the first illuminating fiber is formed of single-crystal sapphire, the Raman band of sapphire is located at a Raman shift of 646 cm$^{-1}$ and does not superimpose the Raman bands of the biological tissue.

Here, in the calculation in steps S3 to S6, determining the coefficient A that would cause the intensity of a Raman band of the first illuminating fiber 61 to become a noise level by referring to the Raman band of 692 cm$^{-1}$ of fluorinated plastic, the Raman band of 602 cm$^{-1}$ of PMMA, or the Raman band of 646 cm$^{-1}$ of single-crystal sapphire, serving as materials of the first illuminating fiber 61, means to determine the coefficient A that results in $\alpha - A\alpha' \approx 0$ in expression (2), and under this condition, the terms including $\beta\gamma L_2\sigma_2 I$ and $\gamma L_3\sigma_2 I$ in expression (3) are also deleted together. By doing so, not only the Raman spectrum of the first illuminating fiber 61 but also the Raman spectra of the second illuminating fiber 62 and the light-collecting fiber 7 formed of silica are removed, thereby making it possible to obtain only the Raman scattered light $S_{in}$ of the examination subject S.

As graphically indicated by the Si bands in FIG. 8, the Raman bands originating from silica as the fiber-constituting material appear as broad Raman bands from 780 cm$^{-1}$ to 860 cm$^{-1}$, from 1020 cm$^{-1}$ to 1100 cm$^{-1}$, and from 1120 cm$^{-1}$ to 1250 cm$^{-1}$. Therefore, the Raman bands originating from biological tissue appear in the same Raman shift region as that of the Raman bands of silica, causing the Raman bands from biological tissue and the Raman bands from silica to overlap each other. For example, the Raman bands of collagen in connective tissue have peaks at 815 cm$^{-1}$, 855 cm$^{-1}$, 880 cm$^{-1}$, 920 cm$^{-1}$, 940 cm$^{-1}$, from 1000 cm$^{-1}$ to 1100 cm$^{-1}$, and from 1230 cm$^{-1}$ to 1300 cm$^{-1}$ and thus superimpose the Raman bands of silica.

In such a case, if all the first illuminating fiber 61, the second illuminating fiber 62, and the light-collecting fiber 7 are optical fibers formed of silica, the Raman scattered light $S_{in}$ of biological tissue superimposes $\sigma\gamma L_1\sigma_1 I + \alpha\beta\gamma L_2\sigma_2 I + \alpha\gamma L_3\sigma_2 I$, which is the sum of the first term, the second term, and the third term of expression (2), depending on the Raman shifts, thereby making it difficult to separate the Raman scattered light of biological tissue from the Raman scattered light originating from each of the silica fibers. In this manner, it is not always easy to remove the Raman spectra of the illuminating fibers 61 and 62 and the light-collecting fiber 7 with high accuracy on the basis of the Raman band intensity of silica, and thus time is required to execute, for example, an optimization algorithm in order to achieve sufficiently high accuracy.

In contrast, according to this embodiment, the Raman spectra of all the optical fibers 61, 62, and 7 can be removed together by referring to a Raman band originating from the first illuminating fiber 61, the Raman band not overlapping the Raman bands originating from biological tissue, making it possible to calculate the Raman spectrum of the examination subject S with high accuracy by using an easy algorithm.

The above-described embodiment also leads to the following invention.

One aspect of the present invention is a Raman probe that guides a laser beam from a laser light source, that emits the laser beam towards an examination subject, and that receives Raman scattered light from the examination subject excited by the laser beam, the Raman probe including: a first illuminating fiber that guides the laser beam that is incident thereon from the laser light source; a second illuminating fiber that is arranged in series with the first illuminating fiber, that guides light emitted from the first illuminating fiber, the light containing the laser beam, and that emits the light towards the examination subject; a coupling optical system that optically couples the first illuminating fiber and the second illuminating fiber; an optical filter that is disposed between the first illuminating fiber and the second illuminating fiber, that transmits, of the light emitted from the first illuminating fiber, light having a wavelength equal to or shorter than a predetermined wavelength, the light containing the laser beam, and that blocks light having a wavelength longer than the predetermined wavelength; and a light-collecting fiber that collects light from the examination subject, the light containing Raman scattered light of the examination subject, wherein the first illuminating fiber and the second illuminating fiber are formed of different materials from each other, the second illuminating fiber and the light-collecting fiber are formed of the same material as each other, and the optical filter transmits, of Raman scattered light of the first illuminating fiber excited by the laser beam, Raman scattered light the amount of Raman shift of which is smaller than a predetermined amount of Raman shift in a Raman spectrum of the examination subject.

According to this aspect, the laser beam incident on the first illuminating fiber is incident on the second illuminating fiber via the coupling optical system and is then radiated from the second illuminating fiber onto the examination subject, and Raman scattered light of the examination subject excited by the laser beam is collected by the light-collecting fiber. Therefore, by spectrally dispersing the light collected by the light-collecting fiber, an observed spectrum containing the Raman spectrum of the examination subject is obtained. At this time, because the Raman scattered light of the first and second illuminating fibers, as well as of the light-collecting fiber, is excited by the laser beam being guided by each of the fibers, the observed spectrum contains the Raman spectra of the first and second illuminating fibers, as well as of the light-collecting fiber.

In this case, of the Raman scattered light of the first illuminating fiber, Raman scattered light having an amount of Raman shift smaller than a predetermined amount of Raman shift in the Raman spectrum of the examination subject is selected by the optical filter. Therefore, in the observed spectrum of the light collected by the light-collecting fiber, the intensity of a Raman band originating from the first illuminating fiber appears in a Raman shift region different from Raman bands originating from the examination subject. By referring to the intensity of this Raman band originating from the first illuminating fiber, it is possible to remove, from the observed spectrum, known Raman spectra originating from the first and second illuminating fibers and the light-collecting fiber on the basis of a simple algorithm not only with a small amount of calculation but also with high accuracy, making it possible to acquire a Raman spectrum of the examination subject having a high signal-to-noise ratio.

In the above-described aspect, of the Raman scattered light of the first illuminating fiber, the optical filter may transmit Raman scattered light having an amount of Raman shift of 700 $cm^{-1}$ or less and may block Raman scattered light having an amount of Raman shift of 800 $cm^{-1}$ or more.

By doing so, the Raman scattered light of the first illuminating fiber having passed through the optical filter appears in a region with a Raman shift of 700 $cm^{-1}$ or less in the observed spectrum. In a Raman spectrum of biological tissue, because many of the Raman bands originating from amino-acid side chains and principal chains of protein, lipid, and nucleic acid have an amount of Raman shift larger than 800 $cm^{-1}$, it is possible to prevent the Raman bands originating from the first illuminating fiber from superimposing on the Raman bands originating from the biological tissue in the observed spectrum. This achieves a configuration suitable for acquiring the Raman spectrum of the biological tissue.

In the above-described aspect, the material of the first illuminating fiber may be fluorinated plastic, an acrylic resin, or single-crystal sapphire, and the material of the second illuminating fiber and the light-collecting fiber may be silica.

The Raman spectra of fluorinated plastic, acrylic resin (polymethylmethacrylate group: PMMA), and single-crystal sapphire have a Raman shift region in which the Raman bands thereof do not superimpose on the Raman bands in the Raman spectrum of silica. Therefore, by referring to the Raman scattered light of fluorinated plastic, PMMA, or single-crystal sapphire, the Raman spectrum of each of the fibers can be removed with high accuracy, and the Raman spectrum of the examination subject can be calculated with high accuracy. In addition, low cost can be achieved by employing general optical fibers formed of silica as the second illuminating fiber and the light-collecting fiber disposed adjacent to the examination subject during use.

Another aspect of the present invention is a Raman spectrum measuring device including: one of the above-described Raman probes; a laser light source for supplying the laser beam to the first illuminating fiber; a detection unit that detects light collected by the light-collecting fiber and that acquires data on an observed spectrum containing the Raman spectrum of the examination subject; a memory unit that stores a reflection spectrum of the Raman probe, the reflection spectrum being acquired by collecting, by means of the light-collecting fiber, reflection light of light emitted from the second illuminating fiber and detecting the reflection light by means of the detection unit; and a calculation unit that subtracts the reflection spectrum from the observed spectrum so that the intensity of a band of the Raman scattered light of the first illuminating fiber, the Raman scattered light having passed through the optical filter, becomes equal to or smaller than a predetermined threshold value.

REFERENCE SIGNS LIST

1 Raman probe
2 Laser light source
3 Spectrometer (detection unit)
5 Photodetector (detection unit)
61 First illuminating fiber
62 Second illuminating fiber
7 Light-collecting fiber
8 Coupling optical system
9 Optical filter
12 Memory unit
13 Calculation unit
100 Raman spectrum measuring device
S Examination subject

What is claimed is:

1. A Raman spectrum measuring device comprising:
a Raman probe that guides a laser beam from a laser light source, that emits the laser beam towards an examination subject, and that receives Raman scattered light from the examination subject excited by the laser beam, the Raman probe comprising:
a first illuminating fiber that guides the laser beam that is incident thereon from the laser light source;
a second illuminating fiber that is arranged in series with the first illuminating fiber, that guides light emitted from the first illuminating fiber, the light containing the laser beam, and that emits the light towards the examination subject;
a coupling optical system that optically couples the first illuminating fiber and the second illuminating fiber;
an optical filter that is disposed between the first illuminating fiber and the second illuminating fiber, that transmits, of the light emitted from the first illuminating fiber, light having a wavelength equal to or shorter than a predetermined wavelength, the light containing the laser beam, and that blocks light having a wavelength longer than the predetermined wavelength; and a light-collecting fiber that collects light from the examination subject, the light containing Raman scattered light of the examination subject, wherein the first illuminating fiber and the second illuminating fiber are formed of different materials from each other, the second illuminating fiber and the light-collecting fiber are formed of the same material as each other, the optical filter transmits, of Raman scattered light of the first illuminating fiber excited by the laser beam, Raman scattered light the amount of Raman shift of which is smaller than a predetermined amount of Raman shift in a Raman spectrum of the examination subject, and the Raman spectrum measuring device further comprises:
　a laser light source that supplies the laser beam to the first illuminating fiber;
　a detector that detects light collected by the light-collecting fiber and that acquires data on an observed spectrum containing the Raman spectrum of the examination subject;
　a memory that stores a reflection spectrum of the Raman probe, the reflection spectrum being acquired by collecting, by means of the light-collecting fiber, reflection light of light emitted from the second illuminating fiber and detecting the reflection light by means of the detector; and
　a calculator that determines, by referring to an intensity of a Raman band originating from the first illuminating fiber appeared in a Raman shift region different from a Raman band originating from the examination subject, a coefficient to be multiplied by the reflection spectrum so that an intensity of a band of the Raman scattered light of the first illuminating fiber, the Raman scattered light having passed through the optical filter, becomes equal to or smaller than a predetermined threshold value and that subtracts the reflection spectrum multiplied by the coefficient from the observed spectrum.

2. The Raman spectrum measuring device according to claim 1, wherein, of the Raman scattered light of the first illuminating fiber, the optical filter transmits Raman scattered light having an amount of Raman shift of 700 cm$^{-1}$ or less and blocks Raman scattered light having an amount of Raman shift of 800 cm$^{-1}$ or more.

3. The Raman spectrum measuring device according to claim 1, wherein the material of the first illuminating fiber is fluorinated plastic, and
　the material of the second illuminating fiber and the light-collecting fiber is silica.

4. The Raman spectrum measuring device according to claim 1, wherein the material of the first illuminating fiber is an acrylic resin, and
　the material of the second illuminating fiber and the light-collecting fiber is silica.

5. The Raman spectrum measuring device according to claim 1, wherein the material of the first illuminating fiber is single-crystal sapphire, and
　the material of the second illuminating fiber and the light-collecting fiber is silica.

* * * * *